May 9, 1967 W. L. JOHNSON III 3,318,644
CENTRIFUGAL BEARING LUBRICATION SYSTEM
Filed Feb. 24, 1965
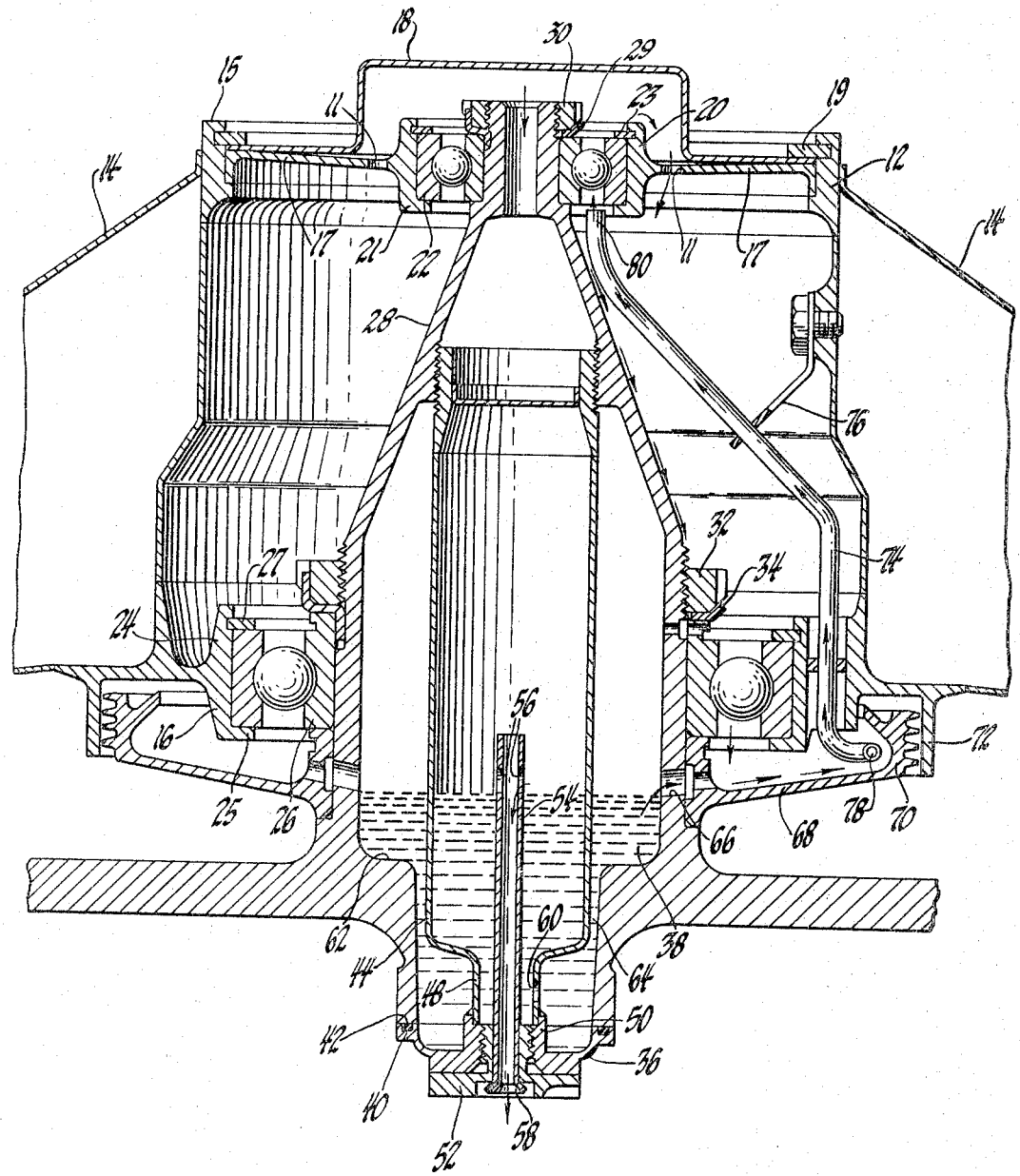
INVENTOR.
Wylie L. Johnson, III
BY
Paul Fitzpatrick
ATTORNEY 3,318,644
CENTRIFUGAL BEARING LUBRICATION SYSTEM
Wylie L. Johnson III, Indianapolis, Ind., assignor to General Motors Corporation, Detroit, Mich., a corporation of Delaware
Filed Feb. 24, 1965, Ser. No. 434,869
6 Claims. (Cl. 308—134.1)

This invention relates generally to a lubrication system and more specifically to an automatic lubrication system for bearings on a vertically disposed rotating shaft, such as a turbine stub shaft in an aft fan lift engine.

Lift engines are utilized only during take-off and landing in VTOL type of aircraft and inasmuch as the lift engine operates only periodically and for short durations, it has been found that adequate lubrication for the engine can be provided utilizing the rotation of the turbine shaft. The need for an external pump is thereby eliminated. In designing the automatic lubrication system responsive to the rotation of the turbine stub shaft, it was desired to provide an adequate lubricant supply reservoir capable of storing lubricant for several intermittent operations, however, it was also desired to limit the amount of lubricant available to the system during operation with the amount available remaining substantially constant for each operation.

Accordingly it is an object of this invention to provide an automatic lubricating system having an adequate supply reservoir for the lubricant.

Another object of the invention is to provide an automatic lubrication system wherein an adequate supply reservoir is provided with means to limit the amount of lubricant available during operation of the system.

Another object is to provide an automatic lubricating system for a periodically operable engine wherein the lubricant available to the system for each operation is limited and substantially constant.

These and other objects will become more readily apparent from the following description of the annexed drawing which is a traverse section of a portion of a gas turbine engine provided with a bearing lubrication system in accordance with the present invention.

Referring to the drawing, there is shown the turbine portion of an aft fan for a vertically disposed gas turbine engine having a central annular structure 12 supported by a plurality of struts 14. The annular structure 12 has an upper collar 15 and a lower collar 16. The upper collar 15 has an internal shoulder which supports a retainer 17 and cover 18 secured by a snap ring 19. The center of retainer 17 is widened into a sleeve 20 with a flange 21 projecting inwardly from its lower end. Retainer 17 has apertures 11 spaced slightly outwardly from sleeve 20. A bearing 22 is mounted in sleeve 20 and retained against flange 21 by a split ring 23. The lower collar 16 has a central sleeve portion 24 with a lower flange 25 which supports a bearing 26 retained by split ring 27. An integral turbine wheel and hollow stub shaft 28 is journaled in the bearings 22 and 26. The upper portion of the shaft 28 tapers inwardly and terminates in an upper end of small diameter which is mounted in and protrudes through the inner race of bearing 22. A nut 30 is threaded to the upper end of the shaft 28 with an intermediate washer 29 abutting the inner bearing race of the upper bearing 22 to aid in supporting the shaft 28 in its vertical position. Midway of the shaft 28, a threaded annular ring 32 engages the shaft with an intermediate washer 34 abutting the lower bearing inner race to complete the support for the vertically disposed turbine shaft 28.

A closure 36 sealingly engages the lower end of hollow shaft 28 to form a reservoir 38 within the shaft. The upper edge of the closure 36 has an annular groove 40 which is fitted with an O-ring 42 to seal the junction between the closure 36 and the end of the shaft 28. The lower portion of a cylinder 44 has an integral neck 48 which is welded or otherwise suitably secured to an upwardly extending boss 50 on closure 36. The cylinder 44 is disposed with the hollow shaft 28 with its upper end 31 threadably engaging the inner surface of the shaft to support it and closure 36. A fitting 52 is threaded into the bore of boss 50 and supports a standpipe 54 extending into the inside of the cylinder 44. The upper end of the standpipe 54 has ports 56 which communicate with the inside of the hollow cylinder 44 through bore 58. An aperture 60 in the neck of the cylinder 44 establishes communication between the inside of the cylinder and the reservoir 38.

The hollow shaft 28 is provided with an internal annular shoulder 62 which divides the reservoir 38 into an upper section of larger diameter and a lower section of smaller diameter. An outlet 66 extends through the hollow shaft 28 and communicates with an annular trough 68 mounted on the outside of the hollow shaft adjacent the outlet 66. The outlet 66 is substantially coplanar with ports 56 so that the outlet will be at or just above the lubricant level established thereby. The outer circumferential edge 70 of the trough 68 is ribbed to form a labyrinth seal with flange 72 on the lower collar 16. A tube 74 supported by a bracket 76 connected to the inside of the annular support 12 has its lower end 78 lying in the trough 68 and its upper end 80 disposed adjacent the upper bearing 22.

Before operation, lubricant is supplied through the opening 58 in standpipe 54 until the reservoir 38 and the inside of the cylinder 44 are filled to the level of the overflow ports 56. With the reservoir and cylinder filled, rotation of the shaft 28 produces centrifugal forces which cause the fluid in the reservoir 38 to flow through outlet 66 into the trough 68. The majority of the fluid in the cylinder 44 will be centrifuged against its walls with only a minimum flowing into the reservoir 38 through aperture 60. The lubricant in the trough 68 will be pumped by ram pressure up the tube 74 and delivered to the bearing 22 through the upper end 80 of the tube 74 which acts somewhat like a nozzle. The lubricant then flows by gravity down the outer circumference of the hollow shaft 28 onto lower bearing 26 with lubricant trapped above the collar 17 being provided with an escape route through apertures 11. Lubricant from the lower bearing 26 is collected in the trough 68 where it can recirculate through the tube 74.

The system thus described is an automatic centrifugal reservoir lubrication system. It is designed for a vertical lift engine which operates only for spaced short durations of time. The centrifugal delivery to the trough 68 and the dynamic pumping action or ram pressure on the lubricant in tube 74 caused by the lubricant in the rotating trough 68 is sufficient to circulate adequate lubricant during these periods of operation and no external pump is required. The lubricant being circulated is likewise limited to prevent excessive lubrication since centrifugal delivery to trough 68 is limited. Note that rotation of the shaft 28 and cylinder 44 causes the major portion of the lubricant in the cylinder 44 to be centrifuged against the inner wall thereof. Since this lubricant will not be delivered to the reservoir through aperture 60, only a limited quantity of lubricant is available in the reservoir 38. When the shaft 28 stops rotating, the lubricant in the trough 68 flows back into reservoir 38. Likewise lubricant flows from the cylinder 44 into reservoir 38 establishing a new lubricant level which partially compensates for losses in lubricant during the previous operation of the system. Thus it can be seen that I have provided an automatic lubrication system for an intermittently operating lift engine having an adequate supply reservoir in which the amount of lubricant available for each operation is limited while remaining substantially constant.

I claim:

1. An automatic lubrication system comprising, in combination:
   a shaft mounted for rotation about a vertical axis,
   a reservoir concentric and rotatable with said shaft,
   a cylinder mounted concentrically in said reservoir,
   means establishing fluid communication between a point inside said cylinder adjacent said axis and said reservoir,
   further means to establish a liquid level for lubricant in said reservoir and cylinder above said first named means, an outlet in said reservoir at said liquid level, and
   delivery means extending from said outlet to a point outside said reservoir whereby rotation of said shaft causes lubricant to be delivered to said second point from said reservoir while an amount of lubricant is retained in said cylinder for delivery to said reservoir when said shaft stops.

2. An automatic lubrication system comprising in combination:
   a hollow shaft mounted for rotation about a vertical axis,
   a closure secured to the bottom of said shaft to form a reservoir with the bore of said shaft,
   a cylinder mounted concentrically in said shaft with its lower end abutting said closure,
   means establishing communication between a point inside said cylinder adjacent said axis and said reservoir,
   standpipe means to fill said cylinder and reservoir with lubricant, said standpipe means including overflow means to establish a liquid level in said cylinder and reservoir above said first named means,
   an outlet in the circumferential wall of said reservoir at said liquid level, and
   delivery means extending from said outlet to a point outside said reservoir whereby rotation of said shaft causes lubricant to be delivered to said point from said reservoir while an amount of lubricant is retained in said cylinder for delivery to said reservoir when said shaft stops.

3. An automatic lubrication system for bearings for a vertically disposed shaft comprising, in combination:
   a hollow shaft mounted for rotation about a vertical axis,
   a closure secured to the bottom of said shaft to form a reservoir with the bore of said shaft,
   a cylinder having an integral neck mounted concentrically in said shaft with said neck abutting said closure,
   an aperture in said neck establishing communication between the inside of said cylinder and said reservoir,
   a standpipe disposed in said cylinder and extending through said closure,
   an overflow port in said standpipe,
   an outlet in the circumferential wall of said reservoir substantially coplanar with said overflow port, and
   delivery means extending from said outlet to a point adjacent one of said bearings whereby rotation of said shaft causes lubricant to be delivered to said bearing from said reservoir while an amount of lubricant is retained in said cylinder for delivery to said reservoir when said shaft stops.

4. An automatic lubrication system for bearings for a vertically disposed shaft comprising, in combination:
   a hollow shaft mounted for rotation about a vertical axis,
   a closure secured to the bottom of said shaft to form a reservoir with the bore of said shaft,
   a cylinder having an integral neck mounted concentrically in said shaft with said neck abutting said closure,
   an aperture in said neck establishing communication between the inside of said cylinder and said reservoir,
   means to establish a liquid level for lubricant in said reservoir and cylinder,
   an outlet in the circumferential wall of said cylinder adjacent said liquid level, and
   delivery means extending from said outlet to a point adjacent one of said bearings whereby rotation of said shaft causes lubricant to be delivered to said bearings from said reservoir while an amount of lubricant is retained in said cylinder for delivery to said reservoir when said shaft stops.

5. An automatic lubrication system for a vertically disposed shaft journaled in at least two spaced bearings in which lubricant is fed to the upper bearing and gravity fed to the lower bearing comprising in combination:
   a hollow shaft mounted for rotation about a vertical axis,
   a closure secured to the bottom of said hollow shaft to form a reservoir with the bore of said shaft,
   a cylinder having an integral neck mounted concentrically within said shaft with said neck abutting said closure,
   aperture means extending through said neck portion,
   means to establish a lubricant level in said cylinder and said reservoir,
   an outlet in the outer circumferential wall of said reservoir adjacent said lubricant level,
   a trough secured to the outer surface of said shaft below the lower of said bearings,
   passage means extending between said outlet and said trough, and
   conduit means having one end disposed in said trough and the other end adjacent the upper of said spaced bearings whereby rotation of said shaft causes lubricant to be delivered to said upper bearing from said reservoir while an amount of lubricant is retained in said cylinder for delivery to said reservoir when said shaft stops.

6. An automatic recirculating lubrication system for a vertically disposed shaft journaled in at least two spaced bearings in which lubricant is fed to the upper bearing and gravity fed to the lower bearing comprising in combination:
   a hollow shaft,
   a closure secured to the bottom of said hollow shaft to form a reservoir with the bore of said shaft, said bore having an internal shoulder and a lower portion of reduced diameter,
   a cylinder having an integral neck mounted concentrically within said shaft, with said neck spaced below said shoulder and abutting said closure,
   aperture means extending through said neck portion,
   a standpipe disposed in said cylinder and extending through said closure to provide a fill means,
   an overflow port in said standpipe, said overflow being above said lower portion of reduced diameter whereby said cylinder and said reservoir may be filled with lubricant above said shoulder to the level of said overflow port,
   a trough secured to the outer surface of said shaft between the lower of said bearings and said lower portion,
   an outlet in said reservoir, said outlet being substantially coplanar with said overflow port,
   passage means extending between said outlet and said trough, and conduit means having one end disposed in said trough and the other end adjacent the upper of said spaced bearings whereby rotation of said shaft causes lubricant to be delivered to said upper bearing from said reservoir while an amount of lubricant is retained in said cylinder for delivery to said reservoir when said shaft stops, said trough receiving said lubricant after being gravity fed to said lower bearing and returning it to said reservoir through said passage means and said outlet.

References Cited by the Examiner

UNITED STATES PATENTS 2,905,510  9/1959  Gardiner _____ 308—134.1

FOREIGN PATENTS 1,061,217  11/1953  France.

LAVERNE D. GEIGER, *Primary Examiner.*

H. S. BELL, *Assistant Examiner.*